(12) United States Patent
Yamamoto et al.

(10) Patent No.: US 9,653,740 B2
(45) Date of Patent: May 16, 2017

(54) FUEL CELL SYSTEM

(71) Applicant: TOYOTA JIDOSHA KABUSHIKI KAISHA, Toyota-shi, Aichi-ken (JP)

(72) Inventors: Kazuo Yamamoto, Toyota (JP); Hiroyuki Imanishi, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/935,864

(22) Filed: Nov. 9, 2015

(65) Prior Publication Data
US 2016/0133972 A1     May 12, 2016

(30) Foreign Application Priority Data

Nov. 12, 2014   (JP) ................................. 2014-230143
Sep. 4, 2015    (JP) ................................. 2015-174979

(51) Int. Cl.
| | | |
|---|---|---|
| *H01M 8/04119* | (2016.01) |
| *H01M 8/0438* | (2016.01) |
| *H01M 8/04537* | (2016.01) |
| *H01M 8/04746* | (2016.01) |

(52) U.S. Cl.
CPC ... *H01M 8/04164* (2013.01); *H01M 8/04388* (2013.01); *H01M 8/04402* (2013.01); *H01M 8/04589* (2013.01); *H01M 8/04761* (2013.01)

(58) Field of Classification Search
CPC ......... H01M 8/04164; H01M 8/04388; H01M 8/04402; H01M 8/04589; H01M 8/04761
See application file for complete search history.

(56) References Cited

U.S. PATENT DOCUMENTS

| | | |
|---|---|---|
| 2007/0196709 A1 | 8/2007 | Umayahara et al. |
| 2010/0015484 A1* | 1/2010 | Ishigaki ............ H01M 8/04097 429/429 |

FOREIGN PATENT DOCUMENTS

| | | |
|---|---|---|
| EP | 1916731 A1 | 4/2008 |
| JP | 2005-302708 A | 10/2005 |
| JP | 2007-305563 A | 11/2007 |

* cited by examiner

*Primary Examiner* — Helen O Conley
(74) *Attorney, Agent, or Firm* — Andrews Kurth Kenyon LLP (57) ABSTRACT

A fuel cell system includes: a fuel cell; a fuel supply source; a supply passage; a circulation passage; a gas-liquid separator; a discharge passage; a discharge valve; a differential pressure detecting portion; and a control unit, wherein the control unit estimates a flow rate of a fuel gas.

4 Claims, 12 Drawing Sheets

FUEL CELL SYSTEM

CROSS-REFERENCE TO RELATED APPLICATION

This application is based upon and claims the benefit of priority of the prior Japanese Patent Application No. 2014-230143, filed on Nov. 12, 2014, and the prior Japanese Patent Application No. 2015-174979, filed on Sep. 4, 2015, the entire contents of which are incorporated herein by reference.

FIELD OF THE INVENTION

The present invention relates to a fuel cell system.

BACKGROUND

There is known a fuel cell system that includes: a gas-liquid separator storing and separating water from a fuel gas partially discharged from a fuel cell; and a discharge valve connected to the gas-liquid separator and partially discharging the fuel gas to the outside together with the stored water in the gas-liquid separator. For example, Japanese Unexamined Patent Application Publication No. 2005-302708 describes technology for estimating a discharge amount of the fuel gas by opening the discharge valve. In some cases, the discharge valve herein includes a discharge outlet opened and closed by a valve body.

To finely estimate the discharge amount of the fuel gas, it is preferable to finely estimate a discharge flow rate of the fuel gas per unit time. The discharge flow rate of the fuel gas is finely estimated conceivably based on, for example, a differential pressure between upstream and downstream sides of the discharge valve during the opening period of the discharge valve. The discharge flow rate is estimated conceivably by use of the detected differential pressure on the basis of, for example, the relationship between the differential pressure and the gas discharge flow rate that is defined beforehand through experimental results.

The estimation of the gas discharge flow rate based only on the differential pressure might, however, degrade the estimation accuracy. For example, although the fuel gas is partially discharged after the stored water is discharged by opening the discharge valve, water generated by electric generation of the fuel cell might be discharged as the stored water from the gas-liquid separator through the discharge outlet of the discharge valve to the outside even during the discharge of the fuel gas. At this time, the stored water and the fuel gas are conceivably discharged from the discharge outlet at the same time. A percentage of an area, through which the fuel gas substantially flows, to a cross sectional area of the discharge outlet is herein by subtracting a percentage of the stored water to the cross sectional area of the discharge outlet therefrom. The percentage of the stored water to the cross sectional area of the discharge outlet varies with the amount of the stored water. Thus, the percentage of the area, through which the fuel gas substantially flows, to the cross sectional area of the discharge outlet varies. Therefore, if the gas discharge flow rate is estimated based only on the differential pressure without considering the percentage of the area, through which the fuel gas substantially flows, to the cross sectional area of the discharge outlet, the estimation accuracy of the gas discharge flow rate might deteriorate.

SUMMARY OF THE INVENTION

It is therefore an object of the present invention to provide a fuel cell system that suppresses deterioration in estimation accuracy of a discharge flow rate of a fuel gas.

According to an aspect of the present invention, a fuel cell system includes: a fuel cell; a fuel supply source that supplies a fuel gas to the fuel cell; a supply passage through which the fuel gas supplied from the fuel supply source flows to the fuel cell; a circulation passage through which the fuel gas partially discharged from the fuel cell flows to the supply passage; a gas-liquid separator that is arranged in the circulation passage and that stores and separates water from the fuel gas partially discharged from the fuel cell; a discharge passage that is connected to the gas-liquid separator, discharges stored water in the gas-liquid separator to an outside, and partially discharges the fuel gas partially discharged from the fuel cell to the outside; a discharge valve that is arranged in the discharge passage; a differential pressure detecting portion that detects a differential pressure between a downstream side of the discharge valve and one of the supply passage, the circulation passage, the gas-liquid separator, and an upstream side of the discharge valve in the discharge passage; and a control unit that estimates a flow rate of the fuel gas partially discharged from the fuel cell partially discharged by opening the discharge valve, wherein the discharge valve includes: a discharge outlet through which the stored water and the fuel gas partially discharged from the fuel cell partially flows; and a valve body that opens and closes the discharge outlet, and the control unit estimates the flow rate of the fuel gas, based on the differential pressure while the discharge valve is opened, and based on a percentage of the fuel gas to a cross sectional area of the discharge outlet, except for a percentage of the stored water to the cross sectional area, while the discharge valve is opened.

The control unit may estimate the percentage of the fuel gas based on a current value of the fuel cell.

The control unit may estimate the flow rate based on composition of the fuel gas.

According to another aspect of the present invention, a fuel cell system includes: a fuel cell; a fuel supply source that supplies a fuel gas to the fuel cell; a supply passage through which the fuel gas supplied from the fuel supply source flows to the fuel cell; a gas-liquid separator that stores and separates water from the fuel gas partially discharged from the fuel cell; a first discharge passage through which the fuel gas partially discharged from the fuel cell flows to the gas-liquid separator; a second discharge passage that is connected to the gas-liquid separator, discharges stored water in the gas-liquid separator to an outside, and partially discharges the fuel gas partially discharged from the fuel cell to the outside; a discharge valve that is arranged in the second discharge passage; a differential pressure detecting portion that detects a differential pressure between a downstream side of the discharge valve and one of the supply passage, the first discharge passage, the gas-liquid separator, and an upstream side of the discharge valve in the second discharge passage; and a control unit that estimates a flow rate of the fuel gas partially discharged from the fuel cell partially discharged by opening the discharge valve, wherein the fuel cell system is an anode non-circulation type in which the fuel gas partially discharged from the fuel cell does not return to the supply passage, the discharge valve includes: a discharge outlet through which the stored water and the fuel gas partially discharged from the fuel cell partially flows; and a valve body that opens and closes the discharge outlet, and the control unit estimates the flow rate of the fuel gas, based on the differential pressure while the discharge valve is opened, and based on a percentage of the fuel gas to a cross sectional area of the discharge outlet, except for a percentage of the stored water to the cross sectional area, while the discharge valve is opened.

DETAILED DESCRIPTION

Figure 1:
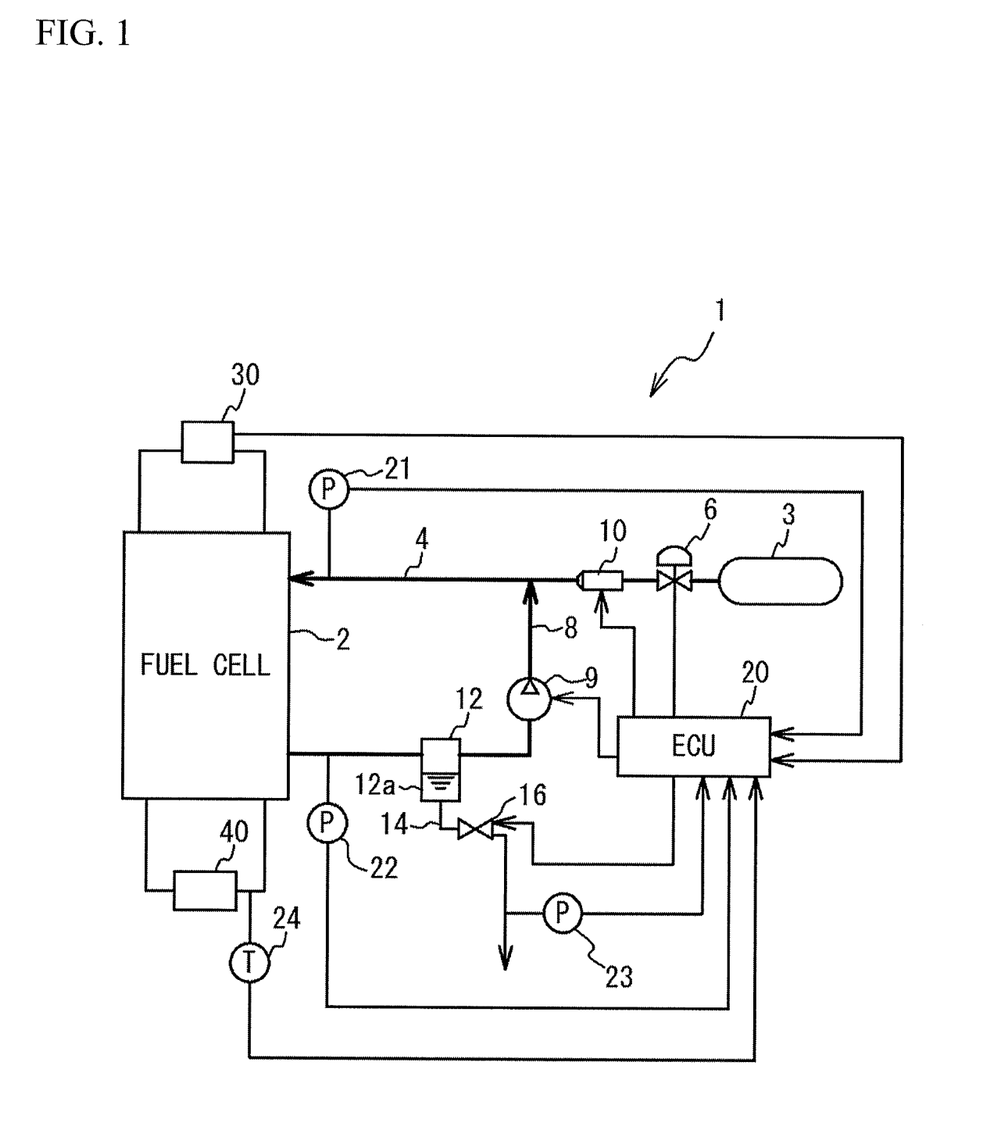
FIG. 1 is a schematic view of a fuel cell system.

In the following, a fuel cell system 1 (referred to as system) according to the present embodiment will be described with reference to drawings. The system 1 can be applied to a system installed in a vehicle. However, the system 1 may be applied to another system. FIG. 1 is a schematic view of the system 1. The system 1 includes a fuel cell 2 as a power supply. In the fuel cell 2, a electrolyte film such as a solid polymer electrolyte membrane is sandwiched between an anode and a cathode of catalyst electrodes (the electrolyte film, the anode, and the cathode are not illustrated). The anode is supplied with a fuel gas containing hydrogen, and the cathode is supplied with a oxidizing gas containing oxygen such air, which generates electricity.

A tank 3 is a fuel supply source supplying the fuel gas to the fuel cell 2. An anode inlet of the fuel cell 2 is connected to a supply passage 4 through which the fuel gas supplied from the tank 3 flows to the fuel cell 2. A regulating valve 6 is arranged in the supply passage 4. The regulating valve 6 reduces the pressure of the fuel gas supplied from the tank 3 to be a predetermined pressure, and then the fuel gas is supplied to the fuel cell 2. Also, an injector 10 is arranged on the downstream side of the regulating valve 6 in the supply passage 4. The injector 10 is an electromagnetic on-off valve. As for the on-off valve, a valve body is directly driven away from a valve seat by the electromagnetic driving force in a predetermined period, thereby regulating a gas flow rate and a gas pressure. The injector 10 and the regulating valve 6 are controlled by an ECU (Electronic Control Unit) 20.

An anode outlet of the fuel cell 2 is connected to a circulation passage 8 through which the fuel gas (a fuel off-gas) partially discharged from the fuel cell 2 flows to the supply passage 4. Specifically, the downstream end of the circulation passage 8 is connected to the supply passage 4. Also, the circulation passage 8 is provided with a circulation pump 9 for pressurizing and supplying the fuel gas partially discharged from the fuel cell 2 to the supply passage 4. Therefore, in this system 1, the fuel gas circulates through the supply passage 4 and the circulation passage 8 during operation of the fuel cell 2.

A part of the circulation passage 8 is provided with a gas-liquid separator 12 that separates water from the fuel gas and has a storage tank 12a for storing the separated water. In the system 1, water generated by the electric generation of the fuel cell 2 leaks through the electrolyte membrane from the cathode side to the anode side. The water moved to the anode side is discharged together with the fuel gas to the circulation passage 8, and then is stored in the gas-liquid separator 12.

A bottom portion of the storage tank 12a of the gas-liquid separator 12 is connected to a discharge passage 14 that discharges the stored water in the gas-liquid separator 12 to the outside and partially discharges the fuel gas partially discharged from the fuel cell 2. The downstream end of the discharge passage 14 is exposed to the outside air. A discharge valve 16 is arranged in the discharge passage 14. The discharge valve 16 is usually closed, but is opened by the ECU 20 as needed. The discharge valve 16 is, for example, a shut-off valve. The discharge valve 16 is opened to discharge the water before the stored water overflows from the storage tank 12a, which can prevent the water from being supplied to the fuel cell 2 through the circulation passage 8 and the supply passage 4.

A pressure sensor 21 that detects the pressure in the supply passage 4 is provided on the downstream side of the injector 10 in the supply passage 4. The pressure sensor 21 basically detects the pressure of the fuel gas to be supplied to the fuel cell 2. A pressure sensor 22 that detects the pressure in the circulation passage 8 is provided on the upstream side of the gas-liquid separator 12 in the circulation passage 8. The pressure sensor 22 basically detects the pressure of the fuel gas partially discharged from the fuel cell 2 and detects the pressure in the upstream side of the discharge valve 16. A pressure sensor 23 that detects the pressure in the downstream side of the discharge valve 16 in the discharge passage 14 is provided therein and that detects the pressure in the downstream side of the discharge valve 16. A detection value of the pressure sensor 23 indicates generally atmospheric pressure. The pressure sensors 21 to 23 are connected to the input side of the ECU 20.

A load device 30 is connected to the fuel cell 2. The load device 30 measures an electric characteristic of the fuel cell 2 and uses, for example, a potentio-galvanostat of a versatile electrochemical type. The load device 30 is electrically connected to an anode side separator and a cathode side separator of the fuel cell 2 through wirings. The load device 30 measures a current flowing through the fuel cell 2 at the time of electric generation thereof and a load voltage (cell voltage) of the fuel cell 2. The load device 30 is an example of a current detecting portion detecting a current value.

The fuel cell 2 is connected to a passage that circulates a cooling medium for cooling the fuel cell 2, and a radiator 40 is provided on the passage. Water, air, or the like can be used as the cooling medium. A temperature sensor 24 that detects the temperature of the cooling medium is provided on the passage in an outlet side of the radiator 40. The temperature sensor 24 is connected to the input side of the ECU 20.

The ECU 20 includes a microcomputer including a CPU (Central Processing Unit), a ROM (Read Only Memory), and a RAM (Random Access Memory). The ECU 20 is electrically connected to each component of the system 1 and controls operation of each component on the basis of information sent therefrom. Also, the ECU 20 is an example of a control unit that executes control for estimating a discharge amount of the fuel gas described later in detail.

Additionally, a passage for supplying oxidation gas is connected to the cathode inlet of the fuel cell 2, and a passage for discharging an oxidation off-gas is connected to the cathode outlet, but they are omitted in FIG. 1.

As mentioned above, the opening of the discharge valve 16 permits the discharge of the stored water from the gas-liquid separator 12 to the outside. At this time, the fuel gas is partially discharged together with the stored water to the outside. It is desirable herein that the actual discharge amount of the fuel gas partially discharged from the discharge valve 16 is controlled to be the same as the target gas discharge amount. This is because, if the actual gas discharge amount is much larger than the target gas discharge amount, the fuel gas might be wasted and the fuel consumption might be degraded. In contrast, if the actual gas discharge amount is much smaller than the target gas discharge amount, for example, if the actual gas discharge amount is zero, the stored water might not be sufficiently discharged. Also, if the gas discharge amount is small, movement of nitrogen from the cathode side to the anode side due to the crossover might increase nitrogen concentration of the fuel, which might adversely influence the fuel consumption. Thus, this system 1 estimates the discharge amount of the fuel gas partially discharged during the opening of the discharge valve 16, and closes the discharge valve 16 when the estimated gas discharge amount reaches the target gas discharge amount.

Figure 2:
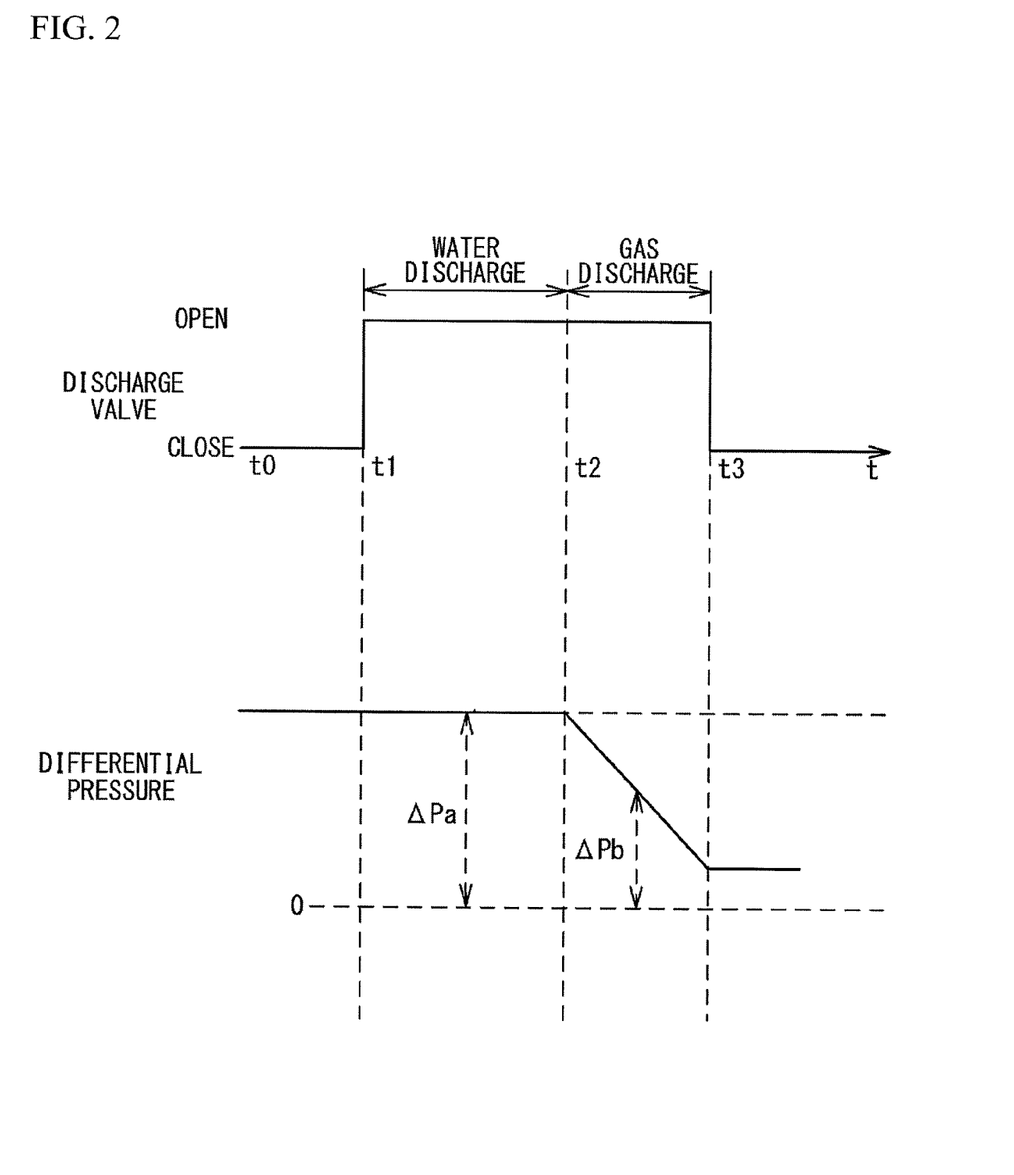
FIG. 2 is a timing chart indicating operation of a discharge valve, and a change in difference in pressure between a circulation passage and a downstream side of a discharge valve in a discharge passage.

Next, a description will be given of a change in pressure by operation of the discharge valve 16. FIG. 2 is a timing chart indicating the operation of the discharge valve 16 and a change in the difference in pressure between the circulation passage 8 and the downstream side of the discharge valve 16 in the discharge passage 14. Additionally, FIG. 2 illustrate a case where the fuel gas is continuously supplied from the injector 10 and where the injector 10 is feedback-controlled such that the pressure in the supply passage 4 detected by the pressure sensor 21 is the same as a target pressure. The difference in pressure between the circulation passage 8 and the downstream side of the discharge valve 16 in the discharge passage 14 (hereinafter referred to as differential pressure) is detected based on the output values from the pressure sensors 22 and 23. In FIG. 2, the discharge valve 16 is closed at time t0, the discharge valve 16 is opened at time t1, the discharge of the stored water from the gas-liquid is completed from time t1 to time t2, and the fuel gas is partially discharged from time t2 to time t3. Also, for convenience of explanation, the differential pressure during the discharge of the stored water is referred to as the differential pressure $\Delta Pa$, and the differential pressure during the discharge of the fuel gas is referred to as the differential pressure $\Delta Pb$.

As illustrated in FIG. 2, the differential pressure $\Delta Pa$ does not change immediately after the discharge valve 16 is opened, but the differential pressure $\Delta Pb$ decreases some time after the discharge valve 16 is opened. In a period from time t0 when the discharge valve 16 is closed to time t2 when the water discharge is completed, the pressure in the circulation passage 8 slightly decreases in reality. However, this decrease amount is negligible, so the differential pressure $\Delta Pa$ does not substantially change. Further, the differential pressure $\Delta Pa$ from time t1 to time t2 does not substantially change. This is because the stored water is discharged from time t1 to time t2, but the fuel gas is not discharged.

When the discharge of the stored water is completed and the gas-liquid separator 12 and the discharge passage 14 communicate with the atmosphere, the fuel gas is partially discharged through the discharge passage 14. As a result, the differential pressure $\Delta Pb$ decreases from time t2 to time t3. This is because the discharge of the fuel gas decreases the pressure in the supply passage 4 communicating with the circulation passage 8. Also, when it is determined that the estimated gas discharge amount by the estimation method to be described later reaches the target gas discharge amount, the discharge valve 16 is closed.

Figure 3:
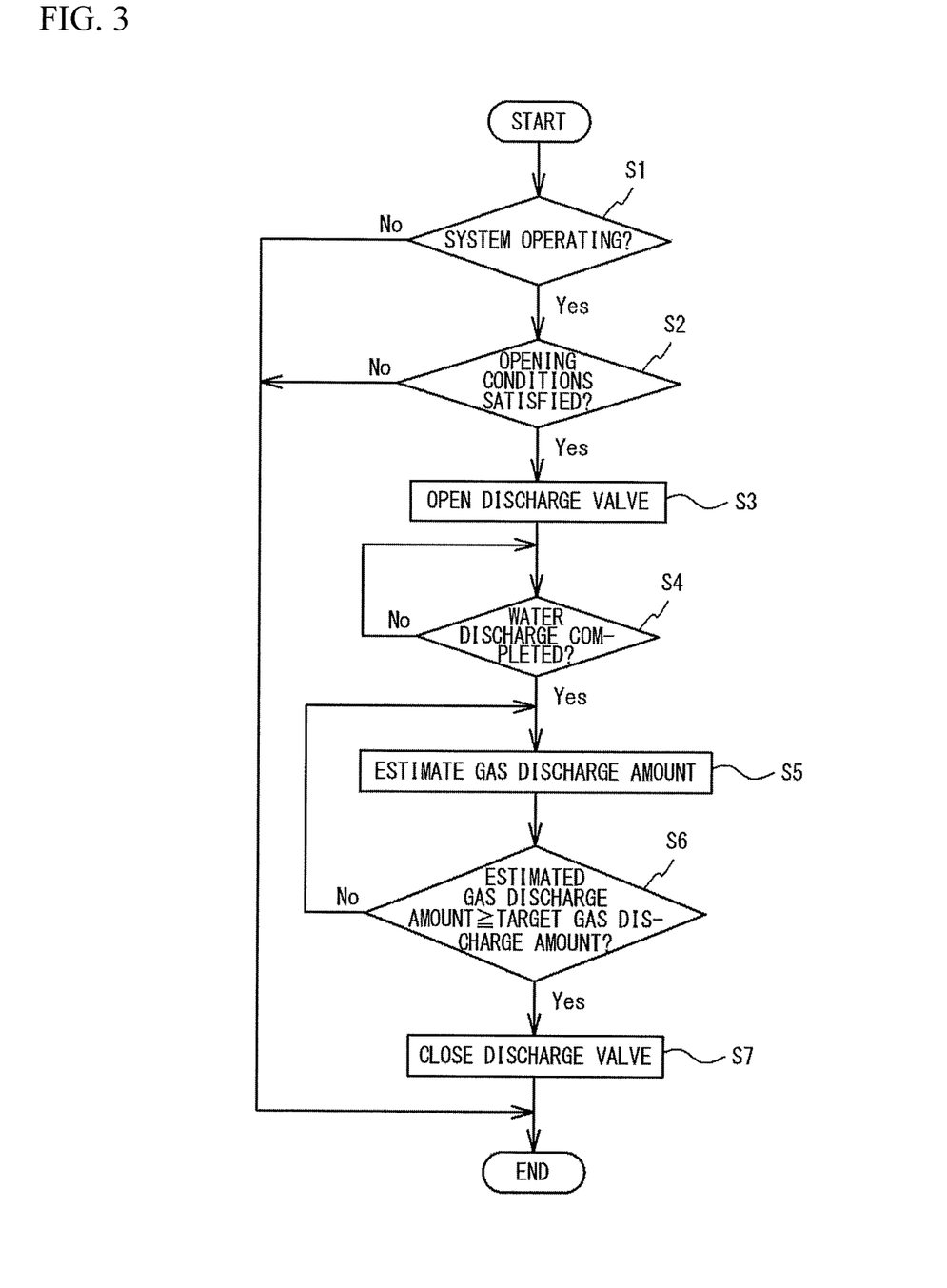
FIG. 3 is a flowchart of opening and closing control for the discharge valve executed by an ECU.

FIG. 3 is a flowchart of the opening and closing control for the discharge valve 16 executed by the ECU 20. The ECU 20 determines whether or not the system 1 is operated (step S1). This is because the discharge process of the stored water is executed when the system 1 is operated. When the system 1 is operated, the ECU 20 executes processes after step S1. When the system 1 is not operated, this control is finished.

Next, the ECU 20 determines whether or not open conditions of the discharge valve 16 are satisfied (step S2). The open conditions are, for example, when a predetermined period elapses from the time when the discharge valve 16 is opened last, but the present invention is not limited to this. When the open conditions are not satisfied, this control is finished. When the open conditions of the discharge valve 16 are satisfied, the ECU 20 opens the discharge valve 16 (step S3) and determines whether or not the water discharge is completed (step S4).

Figure 4:
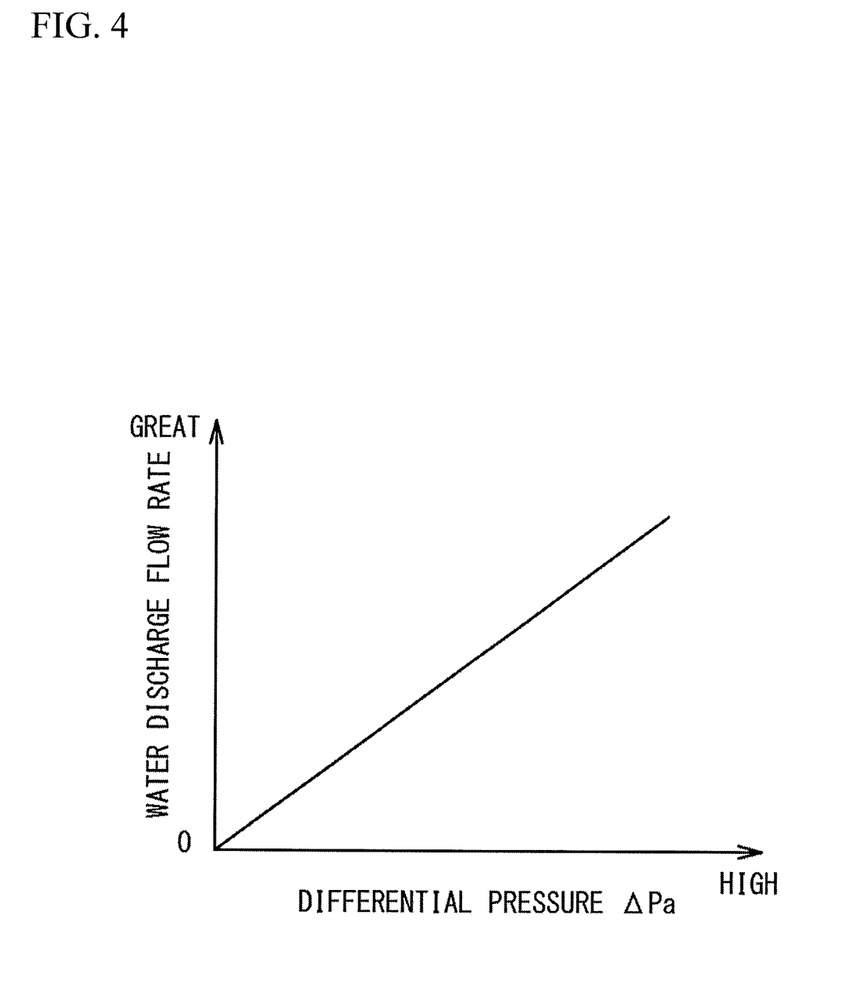
FIG. 4 is a map that defines a relationship between the differential pressure and a water discharge flow rate.
Figure 10:
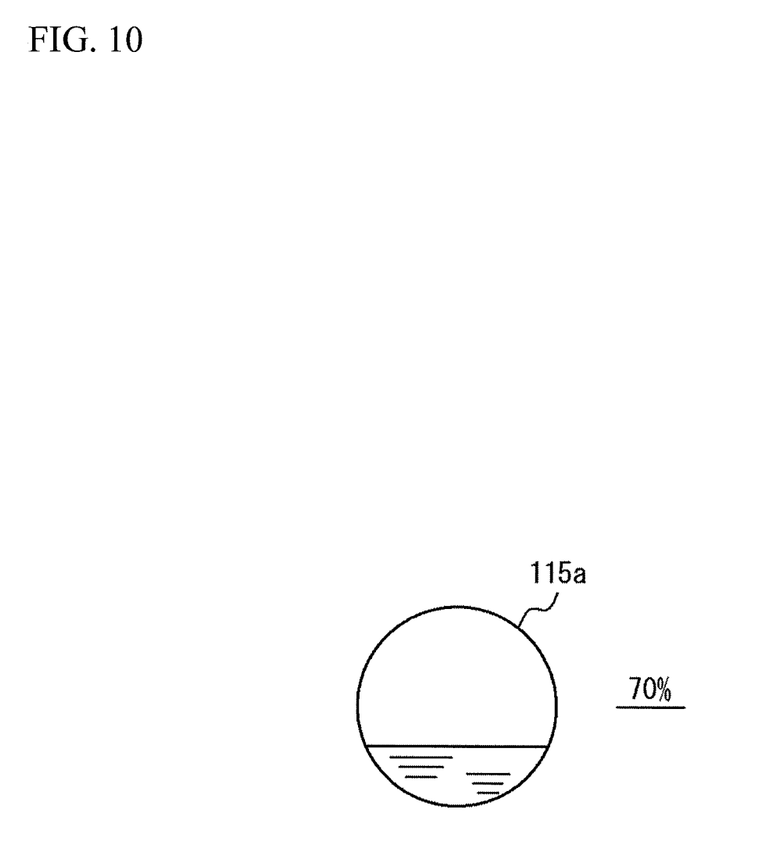
FIG. 10 is a sectional view of the discharge outlet after the water discharge is determined to be completed.

The determination whether or not the water discharge is completed is, for example, as follows. The ECU 20 calculates the stored water amount in the gas-liquid separator 12 just before the discharge valve 16 is opened. For example, the ECU 20 calculates the stored water amount in the gas-liquid separator 12 by calculating the amount of water generated in response to the electric generation of the fuel cell 2 from the time when the water is discharged last, on the basis of a relational equation, a map, or the like associating the generated water amount with the current of the fuel cell 2. The electric generation amount of the fuel cell 2 is calculated based on the current. Next, the ECU 20 estimates the amount of the water discharged from the time when the discharge valve 16 is opened, on the basis of the differential pressure $\Delta Pa$ between the circulation passage 8 and the downstream side of the discharge valve 16. FIG. 4 is a map that defines the differential pressure $\Delta Pa$ and the water discharge flow rate. The ECU 20 calculates the discharge water amount corresponding to the differential pressure $\Delta Pa$ on the basis of this map, integrates the amount from time t1 when the discharge valve 16 is opened to the present time, and estimates the discharge water amount. Additionally, the map of FIG. 10 is defined through experiments beforehand and is stored in the ROM of the ECU 20. The map of FIG. 4 indicates that the discharge water amount per unit time increases as the differential pressure $\Delta Pa$ increases, that is, as the pressure in the circulation passage 8 increases in comparison to the pressure in the downstream side of the discharge valve 16. This is because the higher the differential pressure $\Delta Pa$ is, the more the discharge of the water is promoted. Next, the ECU 20 determines whether or not the estimated water discharge amount is not less than the calculated stored water amount. When the estimated water discharge amount is not less than the calculated stored water amount, the ECU 20 determines that the water discharge is completed. When the estimated water discharge amount is less than the calculated stored water amount, the ECU 20 determines that the water discharge is not completed and continues estimating the stored water until the estimated water discharge amount is not less than the stored water amount. In addition, a way of determining that the water discharge is completed is not limited to the above way. For example, when a decrease rate of the differential pressure is not less than a predetermined value, it may be determined that the gas discharge starts and the water discharge is completed.

When the water discharge is determined to be completed, the ECU 20 estimates the amount of the fuel gas partially discharged by the opening of the discharge valve 16 on the basis of the differential pressure ΔPb (step S5). The ECU 20 determines whether or not the estimated gas discharge amount is not less than the target gas discharge amount (Step S6) and continues estimating the gas discharge amount until the estimated gas discharge amount is not less than the target gas discharge amount. When the estimated gas discharge amount is not less than the target gas discharge amount, the ECU 20 closes the discharge valve 16 (step S7), and this control is finished. With the above control, the stored water in the gas-liquid separator 12 is discharged and the fuel gas is also partially discharged by a desired amount.

Next, a detailed description will be given of the method for estimating the discharge flow rate of the fuel gas. The following equation is for estimating the gas discharge flow rate.

[Equation 1]

$$Q = Qr \times \sqrt{\Delta Pb/\Delta Pr} \times Kt \times Kg \times Kc \quad (1)$$

The gas discharge flow rate Q stands for the discharge flow rate of the fuel gas. The reference flow rate Qr and the reference differential pressure ΔPr are preset fixed values to be described later. The differential pressure ΔPb is detected by the pressure sensors 22 and 23. The correction coefficient Kt considers the temperature of the fuel gas. The correction coefficient Kg considers the composition of the fuel gas. The correction coefficient Kc considers the percentage of the liquid water occupying the discharge outlet of the discharge valve 16, as will be described later. The flow rate is calculated through the above equation after the water discharge is completed, and then the flow rate is time-integrated to estimate the gas discharge amount.

Figure 5:
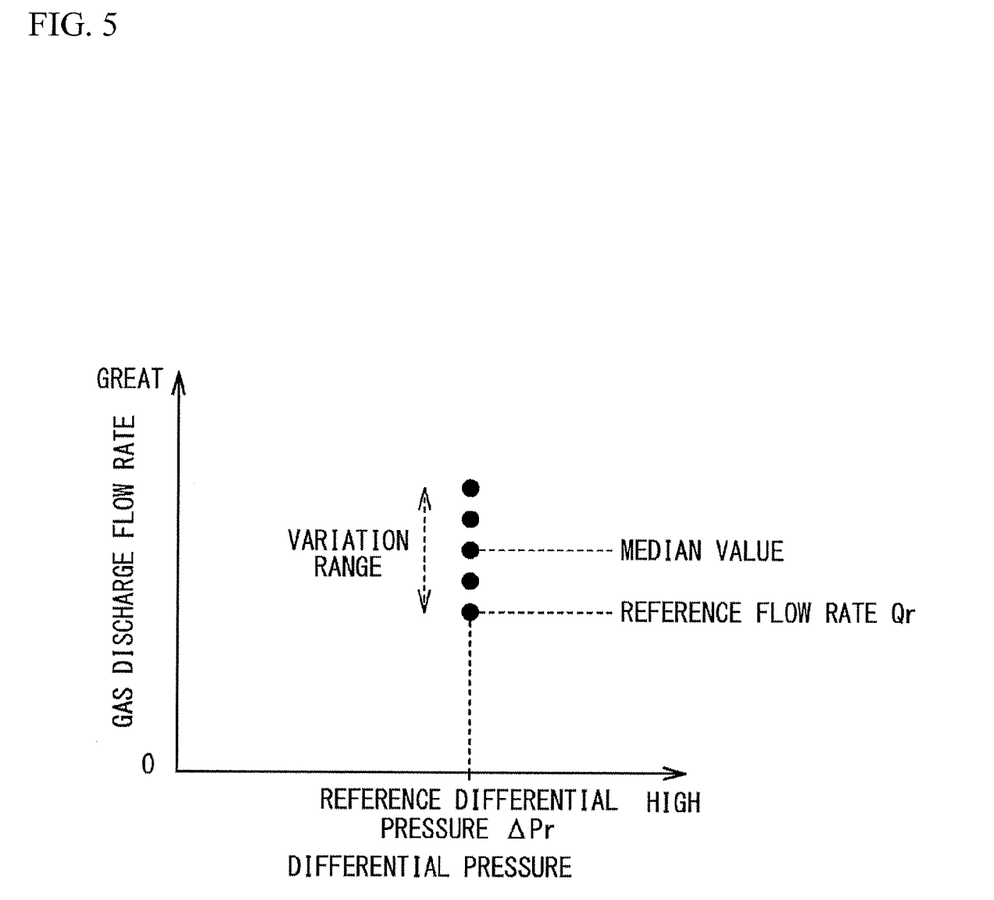
FIG. 5 is a graph for describing a reference flow rate and a reference differential pressure.

Then, a detailed description will be given of the reference flow rate Qr and the reference differential pressure ΔPr. FIG. 5 is a graph for describing the reference flow rate Qr and the reference differential pressure ΔPr. In the experiments, plural different flow rates are obtained by measuring the gas discharge flow rate under conditions of a predetermined reference pressure difference ΔPr. Even under conditions of the constant reference pressure difference ΔPr in this way, a flow rate value varies in reality. The reference flow rate Qr is herein set to be a value by subtracting a predetermined value from the median value of plural flow rate values that can be obtained under conditions of the predetermined reference pressure difference ΔPr. This reason is as follows. If the gas discharge flow rate is estimated based on, for example, the median value or an average value used as the reference flow rate Qr, the estimated flow rate might be higher than the actual flow rate since a flow rate value varies in reality. Thus, although the actual gas discharge amount does not reach the target gas discharge amount, the estimated gas discharge amount might be determined to reach the target gas discharge amount, which might close the discharge valve 16. In this case, the actual gas discharge amount might be smaller than the target gas discharge amount, so that the nitrogen concentration of the fuel gas increases due to the crossover, which might adversely influence the electric generation of the fuel cell 2. The embodiment sets the reference flow rate Qr in consideration of such a variation in the flow rate and estimates the gas discharge flow rate Q. This suppresses the actual gas discharge amount from being smaller than the estimated gas discharge amount, thereby suppressing the deterioration in the estimation accuracy of the flow rate.

Next, the correction coefficient Kt will be described. The correction coefficient Kt is calculated by the following equation.

[Equation 2]

$$Kt = \sqrt{(Tr+273.15)/(Ta+273.15)} \quad (2)$$

The temperature Ta stands for the actual temperature of the fuel gas such as the temperature of the cooling medium obtained by the temperature sensor 24. The reference temperature Tr stands for the temperature of the fuel gas when the flow rate is measured under conditions of the reference pressure difference ΔPr described above. When the volume and the pressure of the fuel gas change depending on temperature, the flow rate also changes. Thus, in consideration of the temperature of the fuel gas, the deterioration in estimation accuracy of the flow rate is suppressed.

Next, the correction coefficient Kg will be described. The correction coefficient Kg is calculated through the following equations.

[Equation 3]

$$Kg = \sqrt{Gr/Ga} \quad (3)$$

[Equation 4]

$$Gr = D1r \times 2 + D2r \times 28 + D3r \times 18 \quad (4)$$

[Equation 5]

$$Ga = D1 \times 2 + D2 \times 28 + D3 \times 18 \quad (5)$$

The reference gas composition value Gr is the sum of a value obtained by multiplying 2 of molecular weight of hydrogen by the reference hydrogen concentration D1r, a value obtained by multiplying 28 of molecular weight of nitrogen by the reference nitrogen concentration D2r, and a value obtained by multiplying 18 of molecular weight of water by the reference water vapor concentration D3r. The reference gas composition indicates the composition of the fuel gas defined in the above mentioned experiments. The reference hydrogen concentration D1r, the reference nitrogen concentration D2r, and the reference water vapor concentration D3r are experimentally determined fixed values. Thus, the reference gas composition value Gr is also a fixed value. The gas composition value Ga is calculated based on the hydrogen concentration D1, the nitrogen concentration D2, and the water vapor concentration D3 of the fuel gas D1.

The hydrogen concentration D1, the nitrogen concentration D2, and the water vapor concentration D3 are calculated through the respective following equations.

[Equation 6]

$$D1 = P1/P \qquad (6)$$

[Equation 7]

$$D2 = P2/P \qquad (7)$$

[Equation 8]

$$D3 = P3/P \qquad (8)$$

The total pressure P of the fuel gas is the sum of the hydrogen partial pressure P1, the nitrogen partial pressure P2, and the water vapor partial pressure P3. The total pressure P is obtained based on, for example, output values from the pressure sensor 21 or 22.

Figure 6:
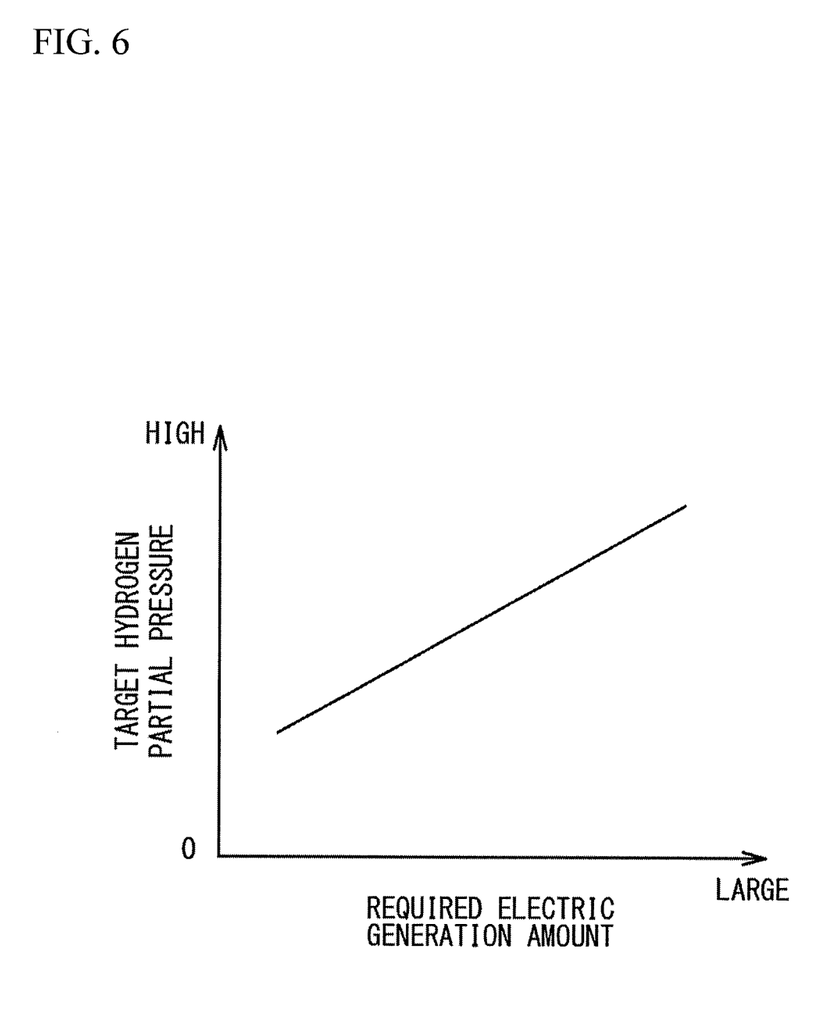
FIG. 6 is a map that defines a relationship between a required electric generation amount of a fuel cell and a target hydrogen partial pressure.

The hydrogen partial pressure P1 is calculated based on, for example, the map in FIG. 6 in further consideration of the hydrogen consumed amount by the electric generation. FIG. 6 is a map that defines a relationship between a required electric generation amount of the fuel cell 2 and a target hydrogen partial pressure. The fuel gas supply amount from the injector 10 is controlled based on this map. Further, the map of FIG. 6 is defined through experiments beforehand and is stored in the ROM of the ECU 20.

The nitrogen partial pressure P2 is calculated as follows: a nitrogen amount calculated based on a percentage of impurities to the fuel within the tank 3 is added to a nitrogen amount moved from the cathode side to the anode side due to the crossover, a nitrogen amount discharged by opening the discharge valve 16 is subtracted therefrom, and a nitrogen partial pressure value calculated last is added thereto. On the basis of a value obtained in such a way, the nitrogen partial pressure P2 is calculated. The nitrogen amount moved due to the crossover is calculated based on a value obtained by multiplying a nitrogen partial pressure difference between the cathode side and the anode side by a permeability coefficient. The nitrogen partial pressure in the anode side for calculating this partial pressure difference is 80 KPa that is a nitrogen partial pressure in atmospheric pressure as an initial value. This is because, in the initial value, the nitrogen partial pressure in the anode side is the same as in the cathode side due to the crossover. In addition, the nitrogen amount calculated based on a percentage of impurities to the fuel within the tank 3 is calculated based on a value obtained by multiplying the percentage of impurities to the fuel within the tank 3 by a hydrogen supply flow rate from the tank 3 to the fuel cell 2. The percentage of impurities to the fuel within the tank 3 is stored in the ROM of the ECU 20 beforehand. A nitrogen amount discharged by opening the discharge valve 16 is calculated as follows: a gas discharge amount continuously integrated based on the flow rate calculated through the equation (1) during the gas discharge is multiplied by a nitrogen partial pressure value previously calculated and is divided by the total pressure. On the basis of a value obtained in such a way, the nitrogen amount discharged by opening the discharge valve 16 is calculated.

The water vapor partial pressure P3 is calculated based on a dew point temperature calculated based on a temperature of the cooling medium used as the temperature of the fuel gas. Specifically, when the temperature of the fuel gas is equal to or less than 80 degrees, the water vapor in the fuel gas is considered in the saturated state, this temperature is considered to be a dew point temperature, and a saturated water vapor pressure corresponding to this temperature by use of the saturated steam curve is used as the water vapor partial pressure. When the temperature of the fuel gas is greater than 80 degrees, the water vapor in the fuel gas is considered in the non-saturated state, a dew point temperature is calculated based on the adapted map, and the water vapor partial pressure is set by a map and the dew point temperature.

The flow rate is estimated in consideration of the composition of the fuel gas in the above-described way, thereby suppressing the deterioration in the estimation accuracy of the flow rate.

Figure 7:
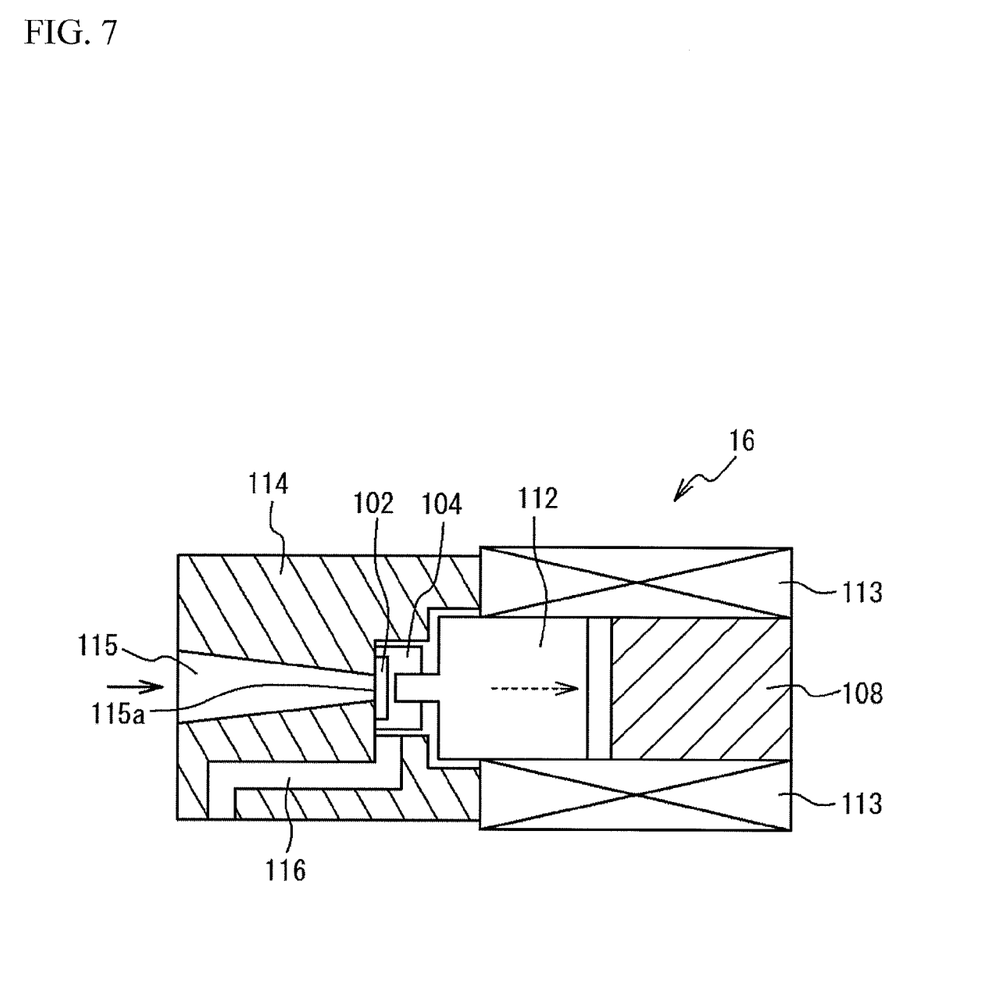
FIG. 7 is a sectional view of the discharge valve.
Figure 8:
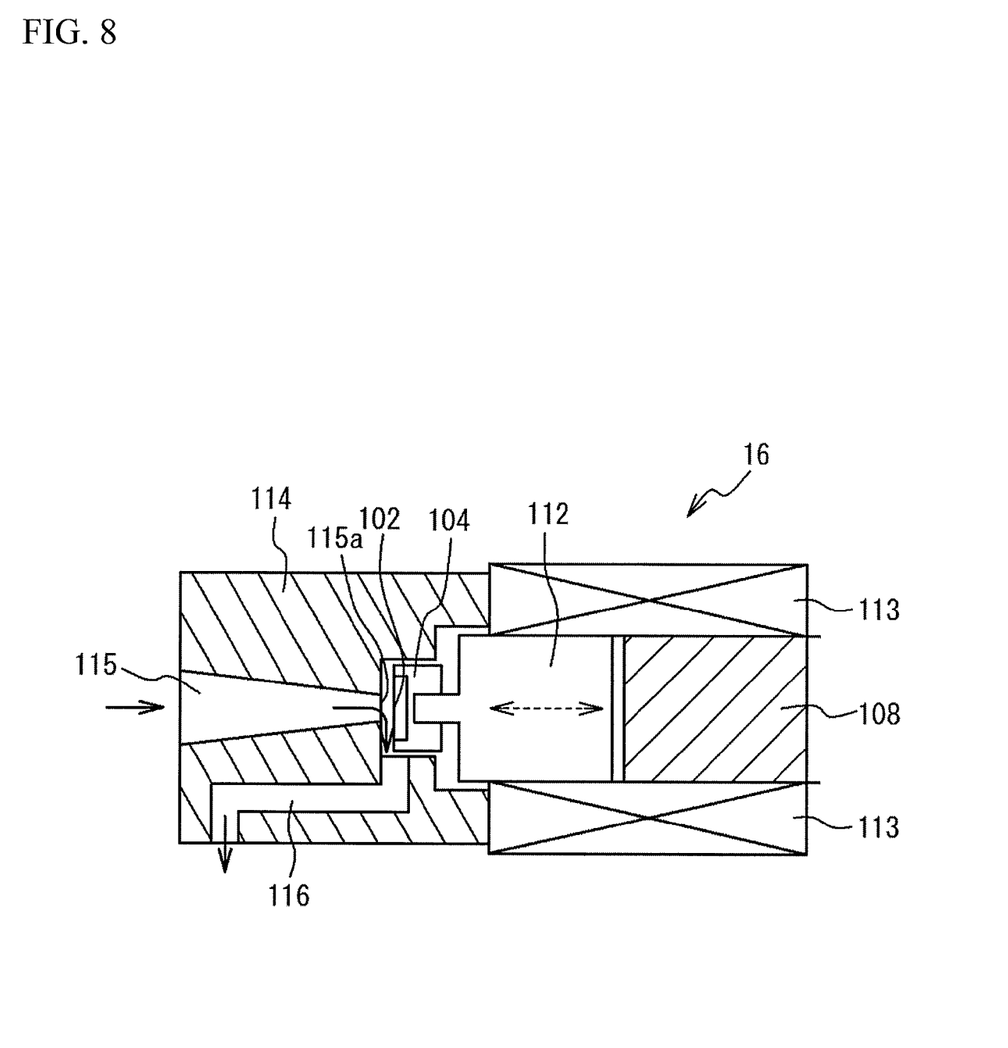
FIG. 8 is a sectional view of the discharge valve.

Next, the correction coefficient Kc will be described. The structure of the discharge valve 16 will be described before describing the correction coefficient Kc. FIGS. 7 and 8 are sectional views of the discharge valve 16. The discharge valve 16 is a direct acting solenoid valve in which a valve body 104 is opened and closed by the operation force of an electromagnetic coil 113. Energization of the electromagnetic coil 113 electrifies an iron core 108, so a plunger 112 slides in the direction of the arrow in FIG. 6. An end of the plunger 112 is secured to the valve body 104, an end of which is secured to a sealing rubber 102. In a flange portion 114, a first channel 115 and a second channel 116 connected to the discharge passage 14 are formed. The first channel 115 extends in the substantially horizontal direction and its diameter gradually decreases from the upstream toward the downstream. In FIG. 7, the valve body 104 closes a discharge outlet 115a at the downstream end of the first channel 115. As illustrated in FIG. 8, the energization of the electromagnetic coil 113 causes the plunger 112 to retreat, so that the valve body 104 opens the discharge outlet 115a. Therefore, the stored water and the fuel gas flow from the first channel 115 to the second channel 116.

Figure 9:
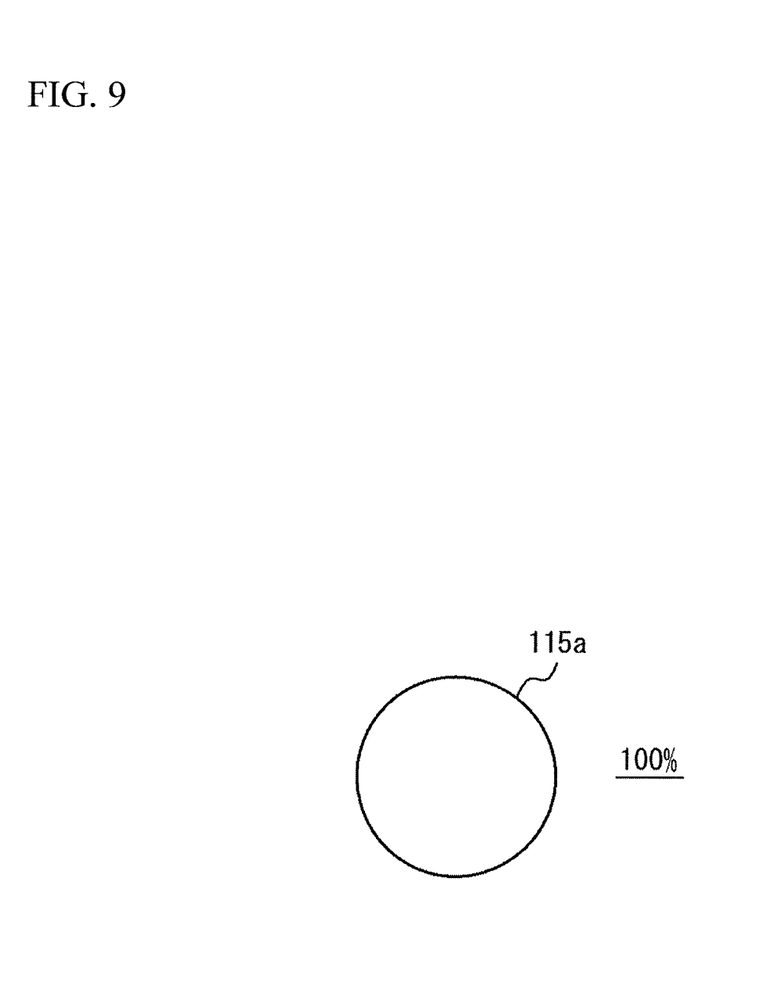
FIG. 9 is a sectional view of a discharge outlet after the water discharge is determined to be completed.

FIGS. 9 and 10 are sectional views of the discharge outlet 115a after the water discharge is determined to be completed. As illustrated in FIG. 9, the fuel gas is partially discharged from the discharge outlet 115a after the water discharge is completed. However, as illustrated in FIG. 10, even after the water discharge is determined to be completed, if there is a large amount of the generated water due to the electric generation of the fuel cell 2, the stored water and the fuel gas may flow through the discharge outlet 115a at the same time. For example, in FIG. 9, a percentage of the cross sectional area of the discharge outlet 115a through which the fuel gas flows is 100 percent. However, in FIG. 10, a percentage of the cross sectional area of the discharge outlet 115a through which the fuel gas flows is 70 percent, and a percentage thereof through which the stored water flows is 30 percent. The correction coefficient Kc represents a percentage of the fuel gas to the cross sectional area of the discharge outlet 115a, except for a percentage of the stored water thereto.

Figure 11:
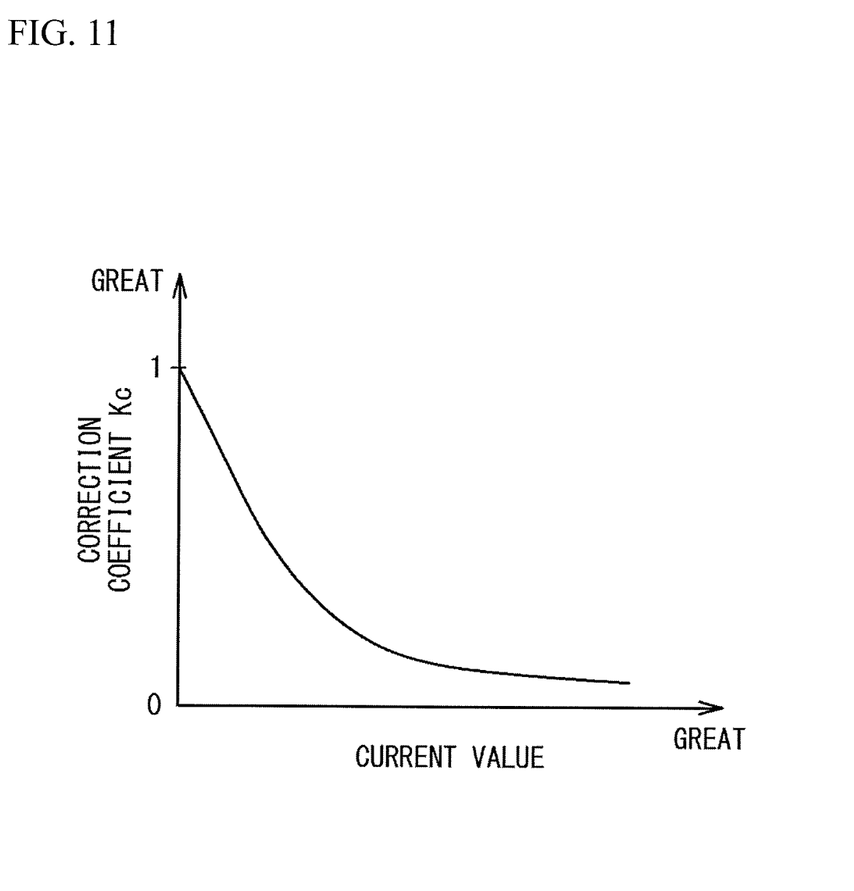
FIG. 11 is a map that defines a relationship between a correction coefficient Kc and a current value of the fuel cell.

FIG. 11 is a map that defines the relationship between the correction coefficient Kc and the current value of the fuel cell 2. The correction coefficient Kc is more than 0 and equal to or less than 1. The higher the current value is, the smaller the correction coefficient Kc is. This is because the amount of the water generated by the electric generation of the fuel cell 2 flowing into the gas-liquid separator 12 increases as the current value increases, increasing a percentage of the stored water to the cross sectional area of the discharge outlet 115a even after the water discharge is determined to be completed, which decreases a percentage of the cross sectional area of the discharge outlet 115a through which the fuel gas substantially flows. Also, the smaller the current value, the greater the correction coefficient Kc is. This is because the amount of the water generated by the electric generation of the fuel cell 2 flowing into the gas-liquid separator 12 decreases as the current value decreases, decreasing a percentage of the stored water to the cross sectional area of the discharge outlet 115a even after the water discharge is determined to be completed, which increases a percentage of the cross sectional area of the discharge outlet 115a through which the fuel gas substantially flows. Further, when the current is 0, the correction coefficient Kc is 1. This is conceivably because the fuel cell 2 does not generate electricity and the generated water amount is 0 when the current value is 0. In addition, the map in FIG. 11 is defined through experiments beforehand and is stored in the ROM of the ECU 20.

Accordingly, the flow rate is estimated in consideration of the cross sectional area of the discharge outlet 115a through which the fuel gas substantially flows, thereby suppressing the deterioration in the estimation accuracy of the flow rate.

As described above, the gas discharge flow rate Q is estimated on the basis of the reference flow rate Qr set in consideration of the variation in flow rate, the correction coefficient Kt set in consideration of the temperature of the fuel gas, the correction coefficient Kg set in the consideration of the composition of the fuel gas, the correction coefficient Kc set in consideration of the percentage of the cross sectional area of the discharge outlet 115a through which the fuel gas substantially flows, and the differential pressure ΔPb. This suppresses the deterioration in the estimation accuracy of the gas discharge flow rate Q.

Also, in the above embodiment, the differential pressures ΔPa and ΔPb are detected by the pressure sensor 22 that detects the pressure in the circulation passage 8, but the present invention is not limited to this. For example, instead of the pressure sensor 22, the detection value of the pressure sensor that detects the pressure in the supply passage 4, the gas-liquid separator 12, or the upstream side of the discharge valve 16 in the discharge passage 14 may be used.

Also, the differential pressures ΔPa and ΔPb are detected by the pressure sensor 23 that detects the pressure in the downstream side of the discharge valve 16 in the discharge passage 14, but the present invention is not limited to this. For example, instead of the pressure sensor 23, a pressure sensor arranged in a position other than the discharge passage 14 and in such a position as to detect atmospheric pressure may be used. The opening of the discharge valve 16 partially discharges the gas to the atmosphere, so such a pressure sensor can detect the pressure in the downstream side of the discharge valve 16.

Figure 12:
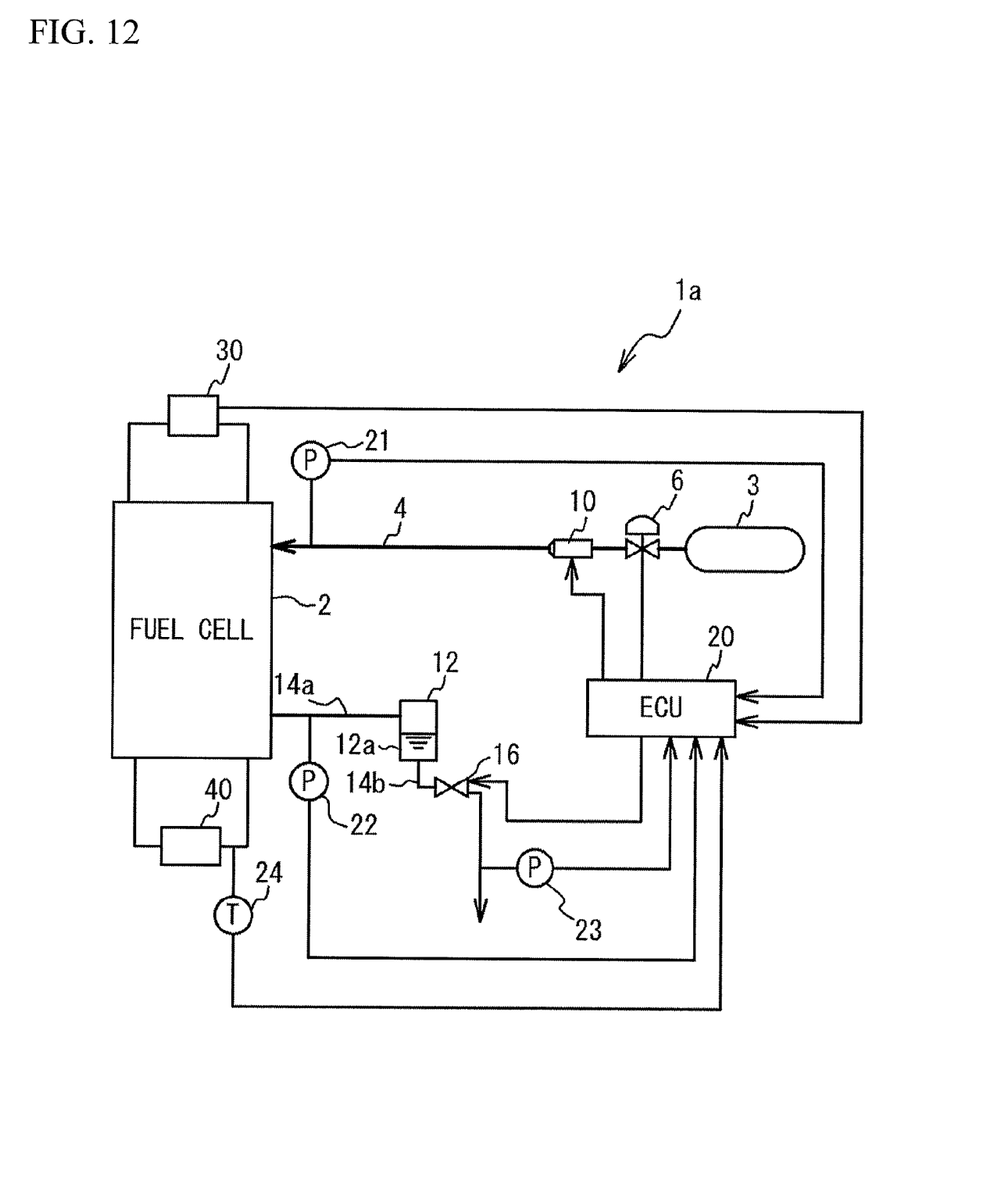
FIG. 12 is a schematic view of a fuel cell system according to a variation.

FIG. 12 is a schematic view of a system 1a according to a second variation. The system 1a is an anode non-circulation type unlike the system 1, the circulation passage 8 or the circulation pump 9 is not provided, and the discharged fuel gas from the fuel cell 2 does not return to the supply passage 4 or the fuel cell 2 again. Also, the system 1a includes: a first discharge passage 14a that supplies the fuel gas partially discharged from the fuel cell 2 to the gas-liquid separator 12; and a second discharge passage 14b that is connected to the gas-liquid separator 12, discharges the stored water in the gas-liquid separator 12 to the outside, and partially discharges the fuel gas to the outside. The discharge valve 16 is arranged in the second discharge passage 14b. Thus, the fuel gas partially discharged from the fuel cell 2 is partially discharged to the outside by opening the discharge valve 16. The pressure sensor 22 is provided in the first discharge passage 14a, and detects the pressure in the first discharge passage 14a. The pressure sensor 23 is provided in the second discharge passage 14b, and detects the pressure in the downstream side of the discharge valve 16 in the second discharge passage 14b. Such a system 1a also suppresses the deterioration in the estimation accuracy of the gas discharge flow rate Q by the above described method. Even in such a case, instead of the pressure sensor 23, a pressure sensor that detects atmospheric pressure may be used. Also, instead of the pressure sensor 22, the detection value of the pressure sensor that detects the pressure in the supply passage 4, the gas-liquid separator 12, or the upstream side of the discharge valve 16 in the second discharge passage 14b may be used.

Although some embodiments of the present invention have been described in detail, the present invention is not limited to the specific embodiments but may be varied or changed within the scope of the present invention as claimed.

The hydrogen concentration, the nitrogen concentration, and the water vapor concentration of the above-described fuel gas may be detected by a sensor.

The first channel 115 of the discharge valve 16 extends horizontally, but the present invention is not limited to this. For example, the first channel 115 may extend vertically downward or obliquely downward. Even in such a case, water generated by the electric generation of the fuel cell 2 as the stored water can flow through the discharge outlet of the discharge valve during the discharge of the fuel gas.

What is claimed is:

1. A fuel cell system comprising:
   a fuel cell;
   a fuel supply source that supplies a fuel gas to the fuel cell;
   a supply passage through which the fuel gas supplied from the fuel supply source flows to the fuel cell;
   a circulation passage through which the fuel gas partially discharged from the fuel cell flows to the supply passage;
   a gas-liquid separator that is arranged in the circulation passage and that stores and separates water from the fuel gas partially discharged from the fuel cell;
   a discharge passage that is connected to the gas-liquid separator, discharges stored water in the gas-liquid separator to an outside, and partially discharges the fuel gas partially discharged from the fuel cell to the outside;
   a discharge valve that is arranged in the discharge passage;
   a differential pressure detecting portion that detects a differential pressure between a downstream side of the discharge valve and one of the supply passage, the circulation passage, the gas-liquid separator, and an upstream side of the discharge valve in the discharge passage; and
   a control unit that estimates a flow rate of the fuel gas partially discharged from the fuel cell partially discharged by opening the discharge valve,
   wherein the discharge valve includes:
      a discharge outlet through which the stored water and the fuel gas partially discharged from the fuel cell partially flows; and
      a valve body that opens and closes the discharge outlet, and
   the control unit estimates the flow rate of the fuel gas, based on the differential pressure while the discharge valve is opened, and based on a percentage of the fuel gas to a cross sectional area of the discharge outlet, except for a percentage of the stored water to the cross sectional area, while the discharge valve is opened.

2. The fuel cell system of claim 1, wherein the control unit estimates the percentage of the fuel gas based on a current value of the fuel cell.

3. The fuel cell system of claim 1, wherein the control unit estimates the flow rate based on composition of the fuel gas.

4. A fuel cell system comprising:
   a fuel cell;
   a fuel supply source that supplies a fuel gas to the fuel cell;
   a supply passage through which the fuel gas supplied from the fuel supply source flows to the fuel cell;
   a gas-liquid separator that stores and separates water from the fuel gas partially discharged from the fuel cell;
   a first discharge passage through which the fuel gas partially discharged from the fuel cell flows to the gas-liquid separator;
   a second discharge passage that is connected to the gas-liquid separator, discharges stored water in the gas-liquid separator to an outside, and partially discharges the fuel gas partially discharged from the fuel cell to the outside;
   a discharge valve that is arranged in the second discharge passage;
   a differential pressure detecting portion that detects a differential pressure between a downstream side of the discharge valve and one of the supply passage, the first discharge passage, the gas-liquid separator, and an upstream side of the discharge valve in the second discharge passage; and
   a control unit that estimates a flow rate of the fuel gas partially discharged from the fuel cell partially discharged by opening the discharge valve,
   wherein the fuel cell system is an anode non-circulation mode in which the fuel gas partially discharged from the fuel cell does not return to the supply passage,
   the discharge valve includes:
      a discharge outlet through which the stored water and the fuel gas partially discharged from the fuel cell partially flows; and
      a valve body that opens and closes the discharge outlet, and
   the control unit estimates the flow rate of the fuel gas, based on the differential pressure while the discharge valve is opened, and based on a percentage of the fuel gas to a cross sectional area of the discharge outlet, except for a percentage of the stored water to the cross sectional area, while the discharge valve is opened.

* * * * *